No. 698,901. Patented Apr. 29, 1902.
F. A. BROWNELL.
PHOTOGRAPHIC CAMERA.
(Application filed July 25, 1900.)

(No Model.) 2 Sheets—Sheet 1.

Witnesses:
H Willard Rich.
Walter B. Payne

Inventor:
Frank A Brownell
by Frederick F Church
his Attorneys.

THE NORRIS PETERS CO., PHOTO-LITHO., WASHINGTON, D. C.

No. 698,901. Patented Apr. 29, 1902.
F. A. BROWNELL.
PHOTOGRAPHIC CAMERA.
(Application filed July 25, 1900.)
(No Model.) 2 Sheets—Sheet 2.

Witnesses:
G. Willard Rich.
Walter B. Payne.

Inventor
Frank A. Brownell
by Frederick S. Church
his Attorney.

UNITED STATES PATENT OFFICE.

FRANK A. BROWNELL, OF ROCHESTER, NEW YORK, ASSIGNOR TO THE EASTMAN KODAK COMPANY, OF ROCHESTER, NEW YORK, A CORPORATION OF NEW YORK.

PHOTOGRAPHIC CAMERA.

SPECIFICATION forming part of Letters Patent No. 698,901, dated April 29, 1902.

Application filed July 25, 1900. Serial No. 24,798. (No model.)

*To all whom it may concern:*

Be it known that I, FRANK A. BROWNELL, of Rochester, in the county of Monroe and State of New York, have invented certain new and useful Improvements in Photographic Cameras; and I do hereby declare the following to be a full, clear, and exact description of the same, reference being had to the accompanying drawings, forming a part of this specification, and to the reference-numerals marked thereon.

My present invention relates to photographic cameras, and particularly to that class adapted to be folded compactly and capable of being carried in the pocket, if desired; and it consists in certain improvements in construction and combinations of parts whereby the camera may be supported so that exposures may be readily made with the camera either in vertical or horizontal position.

The invention further consists in improved constructions which simplify and cheapen the device, all as will be hereinafter fully described, the novel features being pointed out in the claims at the end of this specification.

Figures 1, 4:
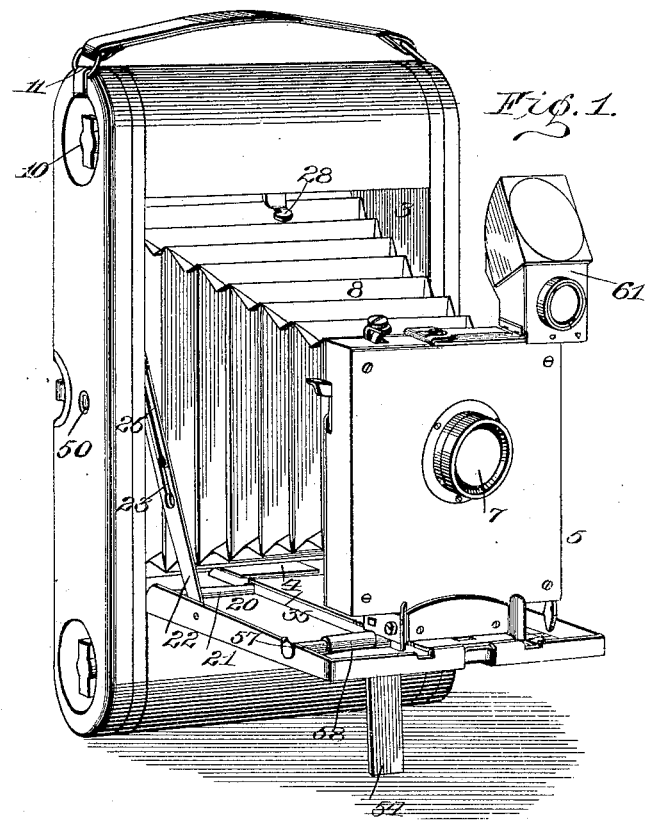
Figure 2:
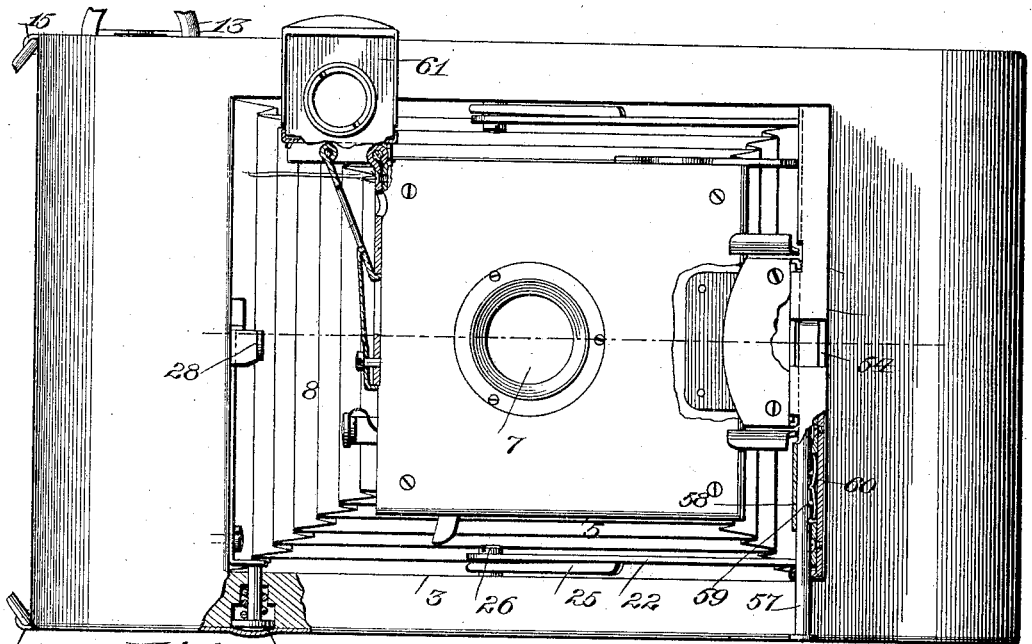
Figure 3:
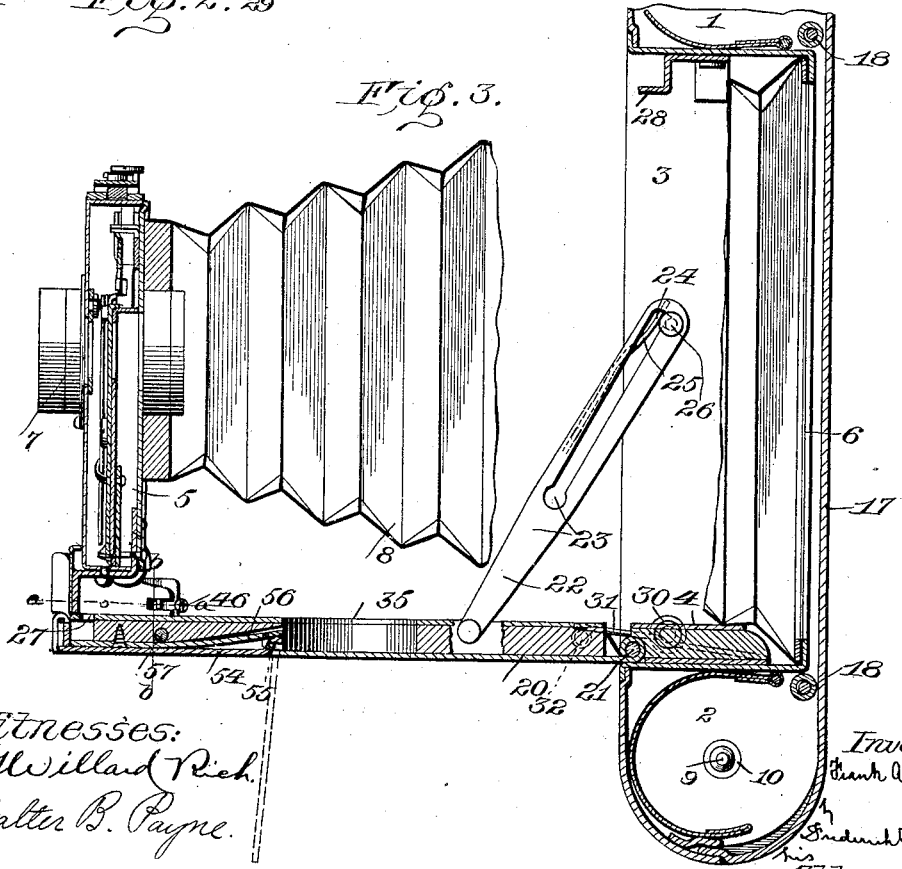

In the drawings, Figure 1 is a perspective view of my camera in vertical position ready for making an exposure; Fig. 2, a front elevation of the camera when located on its side; Fig. 3, a vertical longitudinal sectional view with the parts in the position shown in Fig. 1; Fig. 4, a vertical transverse sectional view of the upper end.

Similar reference-numerals indicate similar parts.

The main casing of the camera is provided with the film-chambers 1 and 2 at top and bottom and a central chamber or recess 3, located between them, open at the front and provided in the lower side with a way or track plate 4, on which the lens-support or camera-front 5 is supported when the camera is folded. At the rear of the chamber 3 is the aperture 6, through which the film is exposed to the light-rays passing through the lens 7, located in the support 5. The rear end of the folding bellows 8 is secured around the aperture 6, and the forward end is attached to the support 5, as usual. The film-spools are held in the chambers 1 and 2 upon suitable centering devices, those in the upper chamber 1 (see Fig. 4) embodying the adjustable stud 9, operating through a plate 10, fixed to the end piece of the casing and having the loop 11 at its upper end extending slightly beyond the casing, and the centering device coöperating with this stud is the winding-key 12, having an operating-handle 13, journaled in a plate 14, also having a loop 15, similar to the loop 11, and to these loops 11 and 15 is attached a carrying-handle 16, as shown in Figs. 1 and 4. At the rear of the casing is a removable cover-plate 17, between which and the rear of the bellows the film and the black paper of a film-cartridge extend in passing from the lower to the upper film-chamber, rollers 18 being arranged at the edges of the film-chambers, as usual.

20 indicates a door, preferably constructed of sheet metal, hinged at 21 to the lower edge of the chamber 3 and adapted to close the latter, with the bellows and lens support inclosed, said door being supported when open by the links 22 hinged thereto and provided with longitudinal slots 23, having the recesses 24 at the upper ends, and also with springs 25, the free ends of which are opposite the recesses.

26 indicates pins secured at the sides of the chamber 3, extending through the slots in the links and engaging in the recesses 24 when the front door is opened, the springs 25 throwing the links upwardly to cause this engagement automatically, as will be understood. The end of the door is provided with a catch-recess 27 in the track-plate 35, coöperating when the door is closed with a hooked catch 28 in the chamber 3, released by a button 29, accessible from the exterior of the casing, and when the catch is released the door is automatically opened by a coiled spring 30 in the chamber 3 and having a free end 31, operating upon a projection 32 on the door. Upon the inner face of the door is a way or track plate 35, which is in line with the way or track 4 when the door is open and, supporting the lens support or front 5, is adapted to slide upon the way thus formed.

The lens-front 5 is supported upon a bracket or slide having fastening devices, such as shown in Patent No. 684,349, the application for which was a division of this application.

When the camera is used to make a time exposure, it may be secured to a tripod, the securing-screw of which may enter the threaded thimble 50 in the side piece; but as tripods are not usually employed in connection with hand-cameras of this general description it is desirable to provide means for holding the camera steady, and as the lens-support is arranged centrally of the casing and is not wide or high enough to rest upon a table or other support I provide extensible supports upon the hinged door, which will effectually support the front end of the camera when extended. The outer side of the door is provided with a recess, in which is arranged a supporting-leg 54, pivoted at 55 and having at its inner end an angular portion, with which coöperates a flat spring 56, adapted to hold the leg folded within the recess and substantially flush with the surface of the door or extended, as shown in Fig. 1, said leg being of such length that the camera-casing may rest upon its lower end and the leg and be held steady.

57 indicates a supporting rod or leg movable in a guide 58 transversely of the door and in a plane parallel therewith and adapted to be extended so that its lower end will engage a table or support when the camera is located on its side, as in Fig. 2, said leg being provided with notches 59, with which engages a spring 60 to hold the leg in adjusted position, though permitting it to be moved in or out, as may be desired, for the purposes of adjustment.

Mounted upon the top of the lens-support is a finder 61, such as shown in Patent No. 684,347, the application for which was filed as a division of this application.

The camera and its attachments as a whole are simple, and the parts being made of sheet metal are durable and easily formed and assembled by unskilled operators.

I claim as my invention—

1. In a camera, the combination with the casing having film-chambers at opposite ends, and a central chamber between them, having the way at the bottom, of a door for closing the central chamber and hinged near one of the film-chambers, and on a center parallel with the axis thereof and the hinged supporting-leg upon the outer side of the door.

2. In a camera, the combination with the casing having the film-chambers at top and bottom, and a central chamber between them, having a way-plate at the bottom, of a door hinged at the lower edge of the central chamber on a center parallel with the axis of the film-chamber and having a way thereon, two extensible legs or supports mounted on the door one movable from the lower face thereof, and the other from one of the sides, a lens-support movable on the ways, and a bellows connected thereto.

3. In a camera, the combination with the casing having the film-chambers at top and bottom and a central chamber between them having a way at the bottom, of a door hinged at the lower edge of the central chamber on a center parallel with the axis of the film-chamber and having a way thereon, the supporting-leg pivoted upon the door and extensible beneath the same, the supporting-leg sliding upon the door and extensible laterally thereof, the lens-support movable on the ways, and the bellows connected thereto.

4. In a camera, the combination with the casing having the film-chambers at top and bottom, and a central chamber between them having a way at the bottom, of a door hinged to the lower edge of the central chamber on a line parallel with that of the film-chamber having a way thereon, the supporting-leg near the outer portion of the door sliding laterally thereof, and movable below the edge when the camera is on its side, and a lens-support movable upon the ways, and a bellows connected thereto.

5. In a camera, the combination with the casing having the film-chambers at top and bottom, and a central chamber between them having a way at the bottom, of a door hinged to the lower edge of the central chamber on an axis parallel with that of the film-chamber having the way thereon, the folding supporting-leg hinged to the outer side of the door, and means for holding it extended at an angle to the door or parallel therewith, a lens-support movable on the ways, and a bellows connected thereto.

6. In a camera, the combination with the casing having the film-chambers at top and bottom, and the central chamber between them having the track-plate therein, the hinged door adapted to close the central chamber having the track-plate thereon, the lens-support movable on the track-plate, and the bellows connected thereto, said support and bellows being adapted to fold within the central chamber, of the plates at the top of the camera-casing having the loops, the handle attached to the loops, and spool-centering devices on the plates and extending into the upper film-chamber.

7. In a camera, the combination with the casing having the central chamber provided with the way at the bottom, of the door hinged to the lower edge of the chamber and movable on the hinge to cover the chamber, ways on the door, the lens-support movable on the ways, and the bellows connected thereto the supporting-links pivoted to the door having the longitudinal slots and provided with recesses at the ends of said slots, and the springs secured to the links, and the pins in the casing operating in the slots and engaged by the springs on the links to lock the door in extended position.

8. In a camera, the combination with the casing having the central chamber, the way therein, the door hinged to the edge of the chamber having the way thereon, and the lens-support movable on the ways, of the notched supporting-leg sliding transversely of the door near the outer portion thereof, and the spring engaging said notches to hold the legs extended.

FRANK A. BROWNELL.

Witnesses:
ELIZABETH B. ROBY,
GEORGE BAXTER.